United States Patent
Feng et al.

(10) Patent No.: US 10,757,332 B2
(45) Date of Patent: Aug. 25, 2020

(54) MOVEMENT COMPENSATION FOR CAMERA FOCUS

(71) Applicant: QUALCOMM Incorporated, San Diego, CA (US)

(72) Inventors: Wen-Chun Feng, Taipei (TW); Micha Galor Gluskin, San Diego, CA (US); Yu Cheng Hsieh, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/019,189

(22) Filed: Jun. 26, 2018

(65) Prior Publication Data

US 2019/0222759 A1 Jul. 18, 2019

Related U.S. Application Data

(60) Provisional application No. 62/616,711, filed on Jan. 12, 2018.

(51) Int. Cl.
| | |
|---|---|
| *H04N 5/232* | (2006.01) |
| *H04N 5/225* | (2006.01) |
| *G06T 7/11* | (2017.01) |
| *G02B 7/28* | (2006.01) |

(52) U.S. Cl.
CPC ..... *H04N 5/23251* (2013.01); *H04N 5/23212* (2013.01); *H04N 5/23254* (2013.01); *H04N 5/23258* (2013.01); *H04N 5/232123* (2018.08)

(58) Field of Classification Search
CPC .......... H04N 5/23251; H04N 5/23212; H04N 5/23293; H04N 5/2254; H04N 5/353; H04N 9/04557; G06T 7/11; G06T 16/434; G02B 7/28

USPC ............ 348/345, 350, 222.1, 208.99, 208.1, 348/208.2, 208.4, 208.12, 208.16, 154, 348/155, 326, 340, 335, 349, 353, 356; 396/79, 80, 82, 89, 121, 122, 123; 382/255

See application file for complete search history.

(56) References Cited

U.S. PATENT DOCUMENTS

| | | | | |
|---|---|---|---|---|
| 7,693,405 | B2 * | 4/2010 | Sakamoto | G03B 17/00 396/55 |
| 7,796,182 | B2 * | 9/2010 | Konishi | H04N 5/232 348/345 |
| 8,648,959 | B2 * | 2/2014 | Capata | H04N 5/232 348/345 |

(Continued)

FOREIGN PATENT DOCUMENTS

| | | |
|---|---|---|
| JP | H10197783 A | 7/1998 |
| JP | 2017058563 A | 3/2017 |

*Primary Examiner* — Marly S Camargo
(74) *Attorney, Agent, or Firm* — QUALCOMM Incorporated

(57) ABSTRACT

Aspects of the present disclosure relate to systems and methods for compensating for camera motion during an autofocus operation. An example device may include a processor and a memory. The processor may be configured to measure a plurality of focus values. Each focus value is measured at a different focal length. The processor also may be configured to detect that a camera motion exists for the measurement of one or more of the plurality of focus values. The processor further may be configured to determine a focal length based on the plurality of measured focus values and the detected camera motion.

16 Claims, 12 Drawing Sheets

(56) References Cited

U.S. PATENT DOCUMENTS

| | | | | |
|---|---|---|---|---|
| 9,188,837 | B2* | 11/2015 | Ishii | H04N 5/232 |
| | | | | 348/349 |
| 9,906,724 | B2* | 2/2018 | Nilsson | H04N 5/2329 |
| | | | | 348/308 |
| 10,387,477 | B2* | 8/2019 | Gluskin | G06F 16/432 |
| | | | | 382/255 |
| 10,397,465 | B2* | 8/2019 | Gluskin | H04N 5/23212 |
| | | | | 348/350 |
| 10,609,274 | B2* | 3/2020 | Shin | H04N 5/232 |
| | | | | 348/349 |
| 2005/0185083 | A1* | 8/2005 | Okawara | H04N 5/232 |
| | | | | 348/345 |
| 2007/0030375 | A1* | 2/2007 | Ogasawara | H04N 5/222 |
| | | | | 348/333.11 |
| 2008/0192139 | A1 | 8/2008 | Kanai et al. | |
| 2008/0239136 | A1 | 10/2008 | Kanai et al. | |
| 2013/0329125 | A1* | 12/2013 | Hannano | H04N 5/23254 |
| | | | | 348/356 |
| 2016/0021297 | A1* | 1/2016 | Iwasaki | H04N 5/23212 |
| | | | | 348/351 |
| 2017/0310876 | A1* | 10/2017 | Somanathan | H04N 5/232 |
| | | | | 348/352 |
| 2019/0356852 | A1* | 11/2019 | Miyazaki | H04N 5/23212 |
| | | | | 348/345 |

* cited by examiner

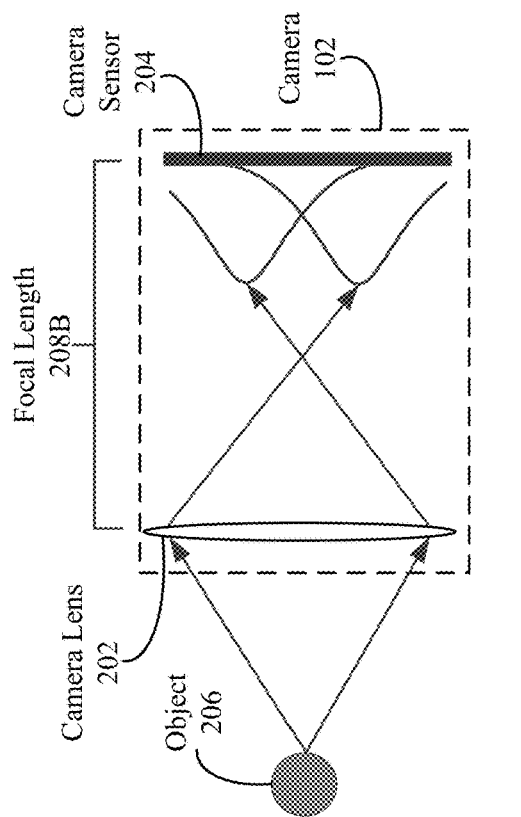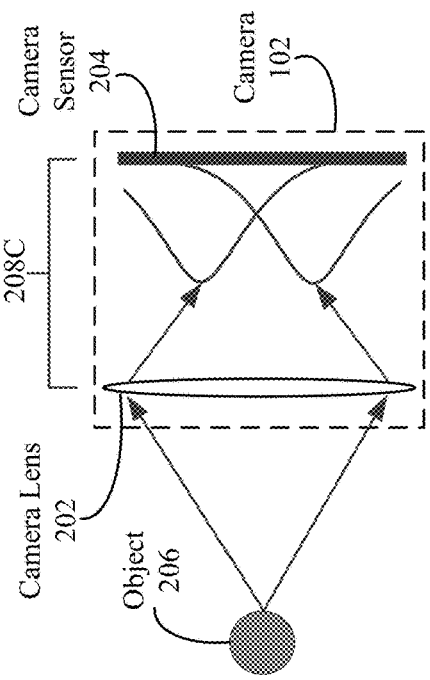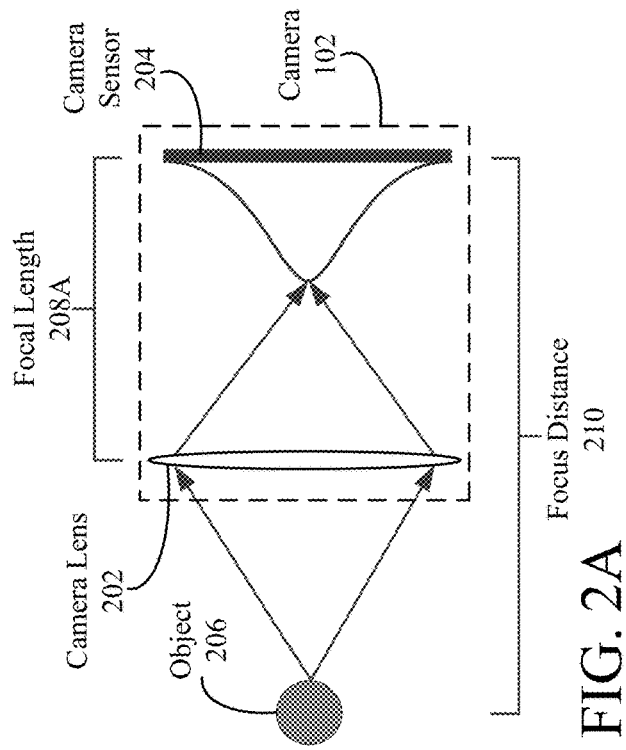
FIG. 2A
FIG. 2B
FIG. 2C

700

Measure a plurality of focus values, wherein each focus value is measured at a different focal length. 702

Detect that camera motion exists for the measurement of one or more of the plurality of focus values. 704

Determine a focal length for the camera based on the plurality of measured focus values and the detected camera motion. 706

MOVEMENT COMPENSATION FOR CAMERA FOCUS

CROSS-REFERENCE TO RELATED APPLICATIONS

This Patent Application claims priority to U.S. Provisional Patent Application No. 62/616,711 entitled "MOVEMENT COMPENSATION FOR CAMERA FOCUS" filed on Jan. 12, 2018 and assigned to the assignee hereof. The disclosure of the prior Application is considered part of and is incorporated by reference in this Patent Application.

TECHNICAL FIELD

This disclosure relates generally to systems and methods for image capture devices, and specifically to compensating for camera movement during camera focus operations.

BACKGROUND OF RELATED ART

Devices including or coupled to one or more digital cameras use a camera lens to focus incoming light onto a camera sensor for capturing digital images. The curvature of a camera lens places a range of depth of the scene in focus. Portions of the scene closer or further than the range of depth may be out of focus, and therefore appear blurry in a captured image. The distance of the camera lens from the camera sensor (the "focal length") is directly related to the distance of the range of depth for the scene from the camera sensor that is in focus (the "focus distance"). Many devices are capable of adjusting the focal length, such as by moving the camera lens to adjust the distance between the camera lens and the camera sensor, and thereby adjusting the focus distance.

Many devices automatically determine the focal length. For example, a user may touch an area of a preview image provided by the device (such as a person or landmark in the previewed scene) to indicate the portion of the scene to be in focus. In response, the device may automatically perform an autofocus (AF) operation to adjust the focal length so that the portion of the scene is in focus. The device may then use the determined focal length for subsequent image captures (including generating a preview).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for compensating for camera movement during camera focus operations. An example device includes a processor and a memory. The processor is configured to measure a plurality of focus values. Each focus value is measured at a different focal length. The processor also is configured to detect that a camera motion exists for the measurement of one or more of the plurality of focus values. The processor further is configured to determine a focal length based on the plurality of measured focus values and the detected camera motion.

In another example, a method is disclosed. The example method includes measuring a plurality of focus values. Each focus value is measured at a different focal length. The example method also includes detecting that a camera motion exists for the measurement of one or more of the plurality of focus values. The example method further includes determining a focal length based on the plurality of measured focus values and the detected camera motion.

In a further example, a non-transitory computer-readable medium is disclosed. The non-transitory computer-readable medium may store instructions that, when executed by a processor, cause a device to perform operations including measuring a plurality of focus values. Each focus value is measured at a different focal length. The operations also include detecting that a camera motion exists for the measurement of one or more of the plurality of focus values. The operations further include determining a focal length based on the plurality of measured focus values and the detected camera motion.

In another example, a device is disclosed. The device includes means for measuring a plurality of focus values. Each focus value is measured at a different focal length. The device also includes means for detecting that a camera motion exists for the measurement of one or more of the plurality of focus values. The device further includes means for determining a focal length based on the plurality of measured focus values and the detected camera motion.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 2A is a depiction of a camera lens at a focal length so that an object is in focus.

FIG. 2B is a depiction of a camera lens at too long of a focal length so that the object is out of focus.

FIG. 2C is a depiction of a camera lens at too short of a focal length so that the object is out of focus.

DETAILED DESCRIPTION

Figure 1:
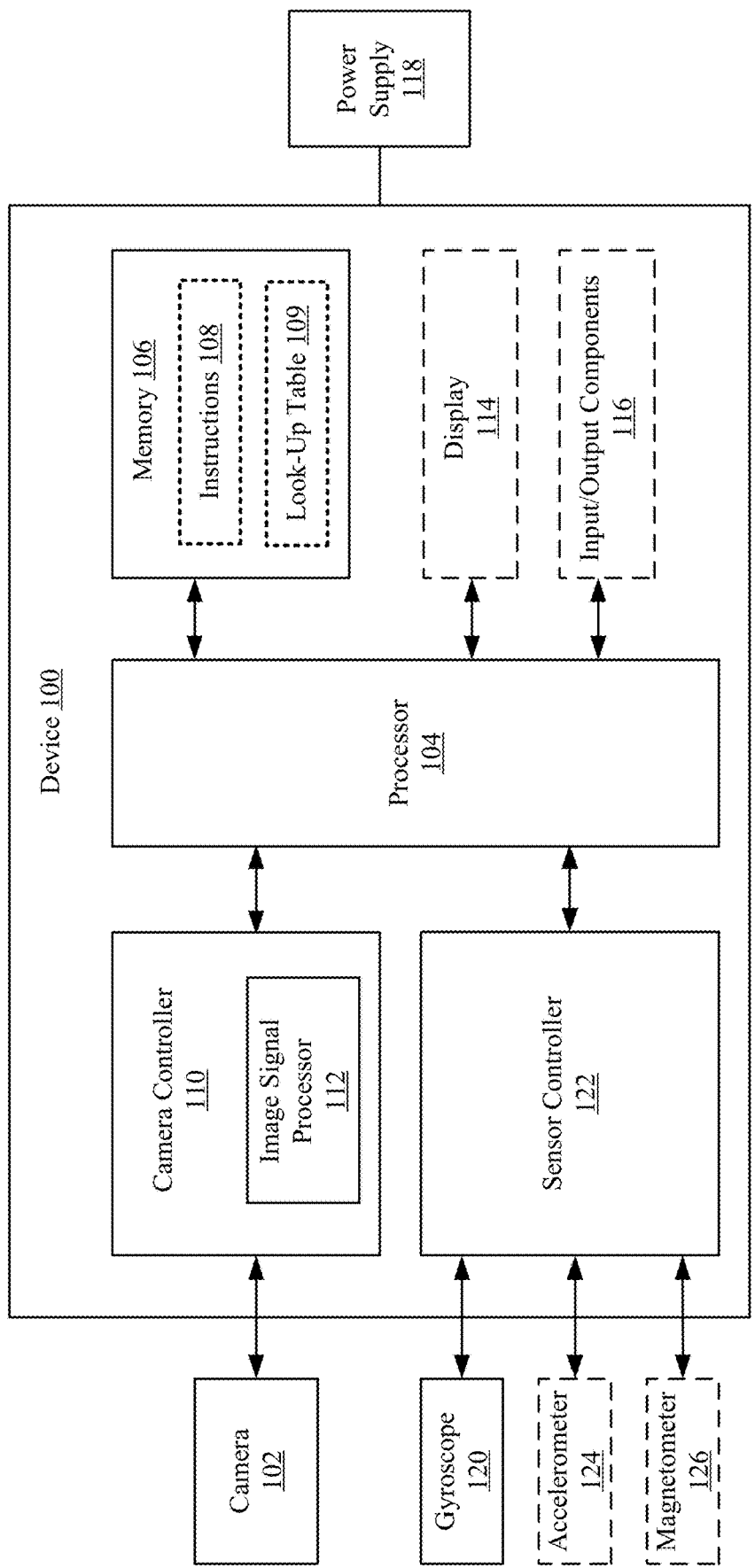
FIG. 1 is a block diagram of an example device for compensating for camera motion during an AF operation.

Aspects of the present disclosure may be used for compensating for camera movement during an AF operation. One problem with conventional AF operations is that camera movements may cause the device to determine an incorrect focal length. For example, a user may capture an image using his or her smartphone, and the smartphone performs an AF operation before image capture. However, the user's hands may involuntarily shake while the smartphone performs the AF operation, and the device jitter may cause the smartphone to determine an incorrect or unsatisfactory focal length.

As a result of device or camera movement during an AF operation causing the device to determine an incorrect focal length, the device may require performing additional AF operations to correct the focal length, or the camera may capture images where the portion of interest of the scene is blurry. For example, if a user uses a camera to capture an image of a person, the camera or device including a camera (such as a smartphone, tablet, and so on) may perform an AF operation to determine a focal length for the camera. Unintended camera movement (such as the user's hands shaking or otherwise moving) may cause the device to determine an incorrect focal length for the camera. The person may thus appear out of focus and blurry in images captured using the determined focal length. Additionally or alternatively, the device may repeat the AF operation before capturing the image, causing the user and person to wait before the user is able to capture an image of the person.

In some example implementations, a device may determine a camera movement when measuring one or more focus values during an AF operation. A device may then compensate for unintended or unwanted camera movement that may negatively impact determining the focal length, and a satisfactory or correct focal length may be determined without repeating an AF operation or measurements during an AF operation. In some aspects, a device may adjust the determined focus values impacted by camera motion. In some additional or alternative aspects, the device may use a portion of the measured focus values to estimate or determine a correlation between the focus values and the focal lengths in order to determine the focal length for the AF operation.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras (including no cameras, where a separate device is used for capturing images or video which are provided to the device), and are therefore not limited to devices having one camera. Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

FIG. 1 is a block diagram of an example device 100 for compensating for camera movement during an AF operation. The example device 100 may include or be coupled to a camera 102, a processor 104, a memory 106 storing instructions 108, a camera controller 110, and a sensor controller 122 coupled to a gyroscope 120. The device 100 may optionally include (or be coupled to) a display 114 and a number of input/output (I/O) components 116. The device 100 may include additional features or components not shown. For example, a wireless interface, which may include a number of transceivers and a baseband processor, may be included for a wireless communication device. The device 100 may include or be coupled to additional cameras other than the camera 102. The disclosure should not be limited to any specific examples or illustrations, including the example device 100.

The camera 102 may be capable of capturing individual image frames (such as still images) and/or capturing video (such as a succession of captured image frames). The camera 102 may include a single camera sensor and camera lens, or be a dual camera module or any other suitable module with multiple camera sensors and lenses. The memory 106 may be a non-transient or non-transitory computer readable medium storing computer-executable instructions 108 to perform all or a portion of one or more operations described in this disclosure. The memory 106 may also store a look-up table (LUT) 109 or other directory to be used when compensating for motion of camera 102 during an AF operation. The device 100 may also include a power supply 118, which may be coupled to or integrated into the device 100.

The processor 104 may be one or more suitable processors capable of executing scripts or instructions of one or more software programs (such as instructions 108) stored within the memory 106. In some aspects, the processor 104 may be one or more general purpose processors that execute instructions 108 to cause the device 100 to perform any number of functions or operations. In additional or alternative aspects, the processor 104 may include integrated circuits or other hardware to perform functions or operations without the use of software. While shown to be coupled to each other via the processor 104 in the example of FIG. 1, the processor 104, the memory 106, the camera controller 110, the optional display 114, the optional I/O components 116, and the sensor controller 122 may be coupled to one another in various arrangements. For example, the processor 104, the memory 106, the camera controller 110, the optional display 114, the optional I/O components 116, and/or the sensor controller 122 may be coupled to each other via one or more local buses (not shown for simplicity).

The display 114 may be any suitable display or screen allowing for user interaction and/or to present items (such as captured images, video, or a preview image) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone and speakers, and so on. The display 114 and/or the I/O components 116 may provide a preview image to a user and/or receive a user input for adjusting one or more settings of the camera 102 (such as selecting and/or deselecting a region of interest of a displayed preview image for an AF operation).

The camera controller 110 may include an image signal processor 112, which may be one or more image signal processors to process captured image frames or video provided by the camera 102. In some example implementations, the camera controller 110 (such as the image signal processor 112) may also control operation of the camera 102. In some aspects, the image signal processor 112 may execute instructions from a memory (such as instructions 108 from the memory 106 or instructions stored in a separate memory coupled to the image signal processor 112) to process image frames or video captured by the camera 102. In other aspects, the image signal processor 112 may include specific hardware to process image frames or video captured by the camera 102. The image signal processor 112 may alternatively or additionally include a combination of specific hardware and the ability to execute software instructions.

The sensor controller 122 may include or be coupled to one or more sensors for detecting motion of camera 102. In one example, the sensor controller 122 may include or be coupled to a gyroscope 120, and may also optionally include or be coupled to an accelerometer 124 and a magnetometer 126. In some aspects, the gyroscope 120 may be used to determine movement of the camera 102. In one example, the gyroscope 120 may be a three-point gyroscope to measure pitch, yaw, and roll of camera 102. In another example, the gyroscope 120 may be a six-point gyroscope to also measure the horizontal and/or vertical displacement of the camera 102. Additionally or alternatively, an accelerometer 124 may be used to determine displacement of the camera 102 and/or a magnetometer 126 may be used to determine changes in the angle of the camera 102 relative to the Earth's magnetic plane. In some alternative implementations, successive camera sensor captures may be used to determine a global motion of the scene in the captures, thus determining movement of camera 102. For example, a first image capture and a second image capture from the camera 102 may be compared to determine if the device 100 moves between capturing the image and the second image. Therefore, while the following examples of the present disclosure describe a gyroscope being used to determine camera motion for illustrative purposes, the present disclosure should not be limited to the specific examples for determining camera motion.

The sensor controller 122 may include a digital signal processor (not shown), and the digital signal processor may be used to perform at least a portion of the steps involved for compensating for motion of the camera 102 during an AF operation. For example, the digital signal processor (or another processor of device 100) may use a gyroscope 120 measurement to determine how much to adjust a focus value measurement. In another example, the sensor controller 122 may coordinate the timing of the focus value measurement with a gyroscope measurement. For example, the image captured by the camera 102 and to be used in determining a focus value may be captured (or light to be measured and the measurements used in determining a focus value may be measured) at approximately the same time the gyroscope 120 measures movement of the camera 102. In this manner, the device 100 may detect a camera motion when an image is captured.

A focus value (as used in the present disclosure) may pertain to different focus measurements for AF operations. In one example, a device 100 may use phase difference autofocus (PDAF) to determine a focal length for the camera 102. For PDAF, two instances of the light from the scene being captured passes through different portions of the camera lens. If the two instances of light align on the camera sensor after passing through the camera lens, the scene is determined to be in focus for image capture. If the two instances hit the camera sensor at different locations, the scene is determined to be out of focus.

FIG. 2A is a depiction of the camera 102 from the device 100 with a camera lens 202 at a focal length 208A (from the camera sensor 204) so that an object 206 is in focus at focus distance 210. FIG. 2B is a depiction of the camera 102 from the device 100 with the camera lens 202 at too long of a focal length 208B so that an object 206 is out of focus. FIG. 2C is a depiction of the camera 102 from the device 100 with the camera lens 202 at too short of a focal length 208C so that an object 206 is out of focus. In some example implementations, the camera 102 includes an actuator (not shown) to move the camera lens 202 toward or away from the camera sensor 204, thus adjusting the focal length (and therefore the focus distance).

The focus value for PDAF may be the phase difference (PD) between two instances of light from the same object hitting the camera sensor 204. For example, the PD may be the number of pixels between the two instances hitting the camera sensor 204. In FIG. 2A, the PD is zero because the two instances (depicted by the arrows from object 206) align on the camera sensor 204. In FIGS. 2B and 2C, the PD is greater than and less than zero, respectively, since the two instances do not align on the camera sensor 204. The PD value may be the number of pixels between the two peaks on the camera sensor 204 (with the curves indicating the intensity values of light from the object 206 measured at each pixel).

Figure 3:
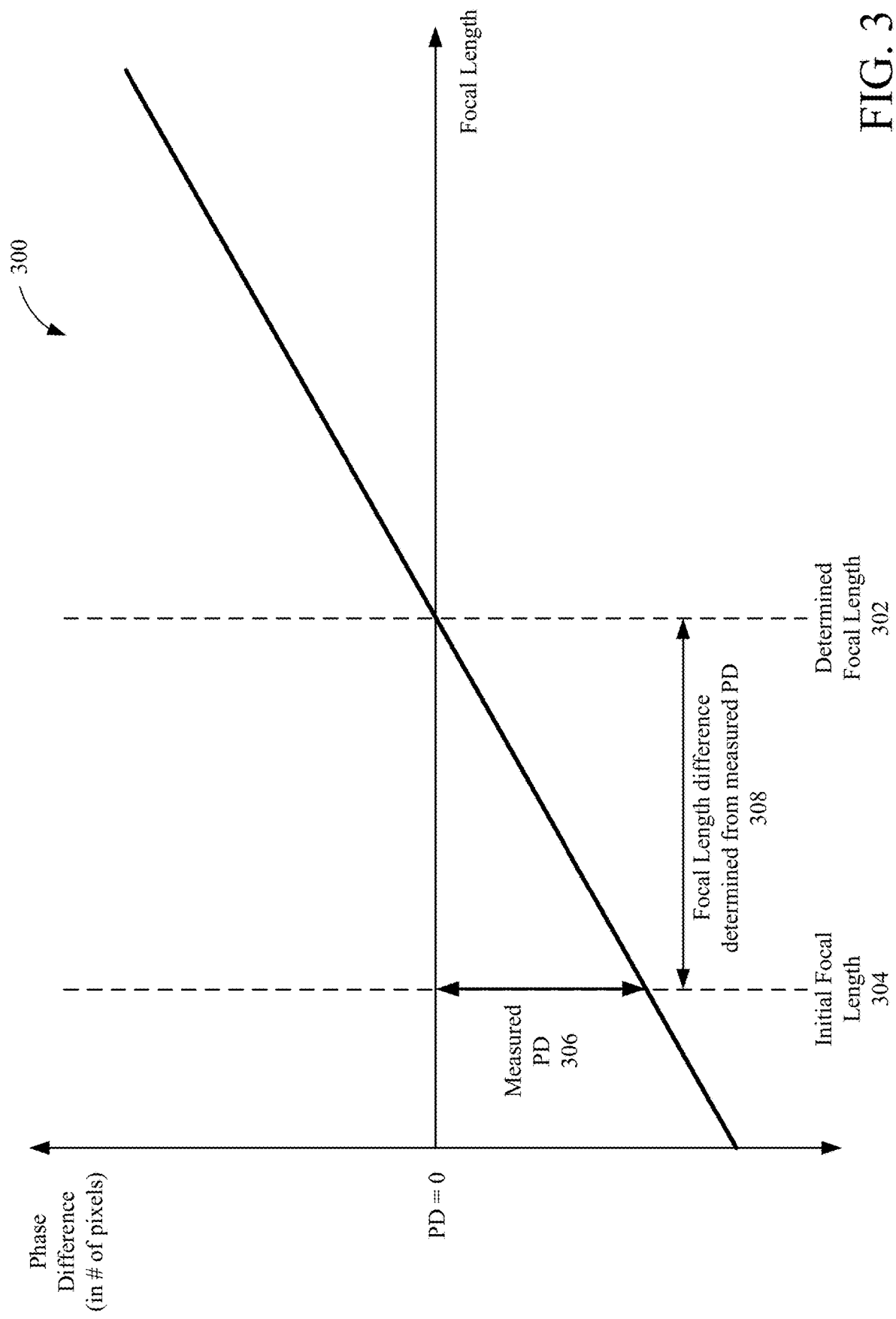
FIG. 3 is a depiction of an example correlation between focal length and phase difference for phase difference autofocus.

FIG. 3 is a depiction 300 of an example correlation between focal length and PD for PDAF. As illustrated, the correlation is linear. If the PD 306 is measured for an initial focal length 304, the device 100 may determine the focal length difference 308 (based on the slope and offset of the PD line) to adjust the camera lens 202 in order to place the camera lens 202 at the determined focal length 302 (where the PD is zero).

In another example, the device 100 may perform a contrast detection autofocus (CDAF) operation, where the focus value is a contrast measurement. When an image goes from out of focus to in focus, the contrast (such as the difference in pixel intensity) between neighboring pixels increases. For example, the difference in intensity between neighboring pixels for a blurry image is lower than the difference in intensity between neighboring pixels for an in-focus image.

Figure 4:
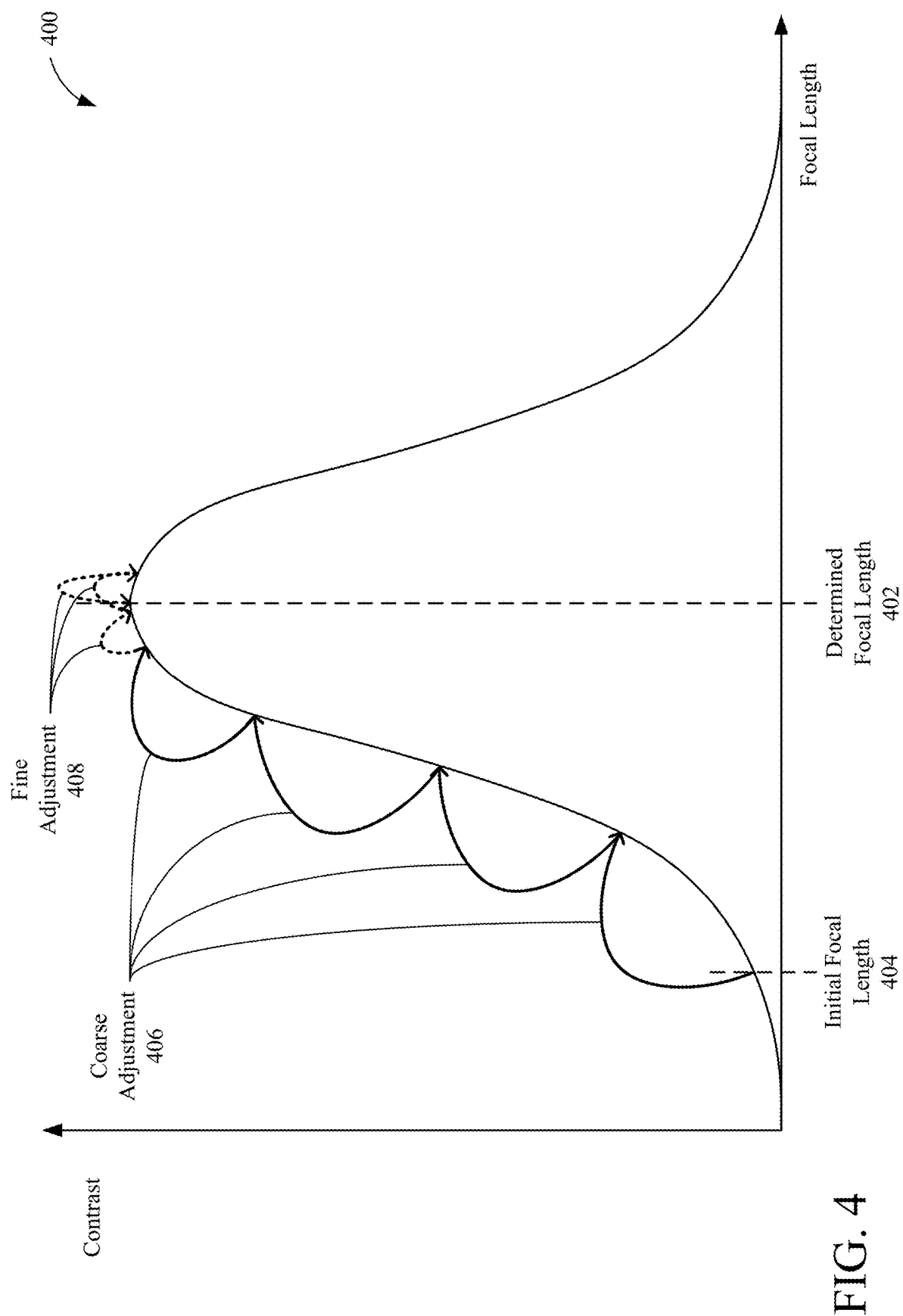
FIG. 4 is a depiction of an example correlation between focal length and contrast for contrast detection autofocus.

FIG. 4 is a depiction 400 of an example correlation between focal length and contrast for CDAF. As shown, the correlation is parabolic/second order. The exact curvature may differ, and the depiction 400 is for illustrative purposes only. For example, the correlation may be expressed in general by a second order equation $y=ax^2+bx+c$, where the contrast is y, the focal length is x, the curvature of the parabola is indicated by a, the slope of the parabola is indicated by b, and the offset of the parabola is indicated by c. The focal length 402 to be determined is based on the contrast being at a maximum, which is the vertex of the parabola. For example, the vertex is $-b/2a$ for the example second order equation.

For CDAF, the device 100 may perform one or more coarse adjustments 406 from the initial focal length 404, and then perform one or more fine adjustments 408 to the determined focal length 402. The device 100 may therefore perform an iterative process of measuring the contrast, adjusting the focal length, and again measuring the contrast until the peak in contrast (the vertex of the contrast curve) is found (and therefore the focal length 402 is determined).

In some other example implementations, the device 100 may perform a hybrid AF operation, combining both CDAF and PDAF. In some further example implementations, the camera 102 may include a dual pixel camera sensor, where a plurality of the pixels in the camera sensor include two photodiodes (with one being used for AF). The AF operation for dual pixel camera sensors is similar to PDAF.

Figure 5:
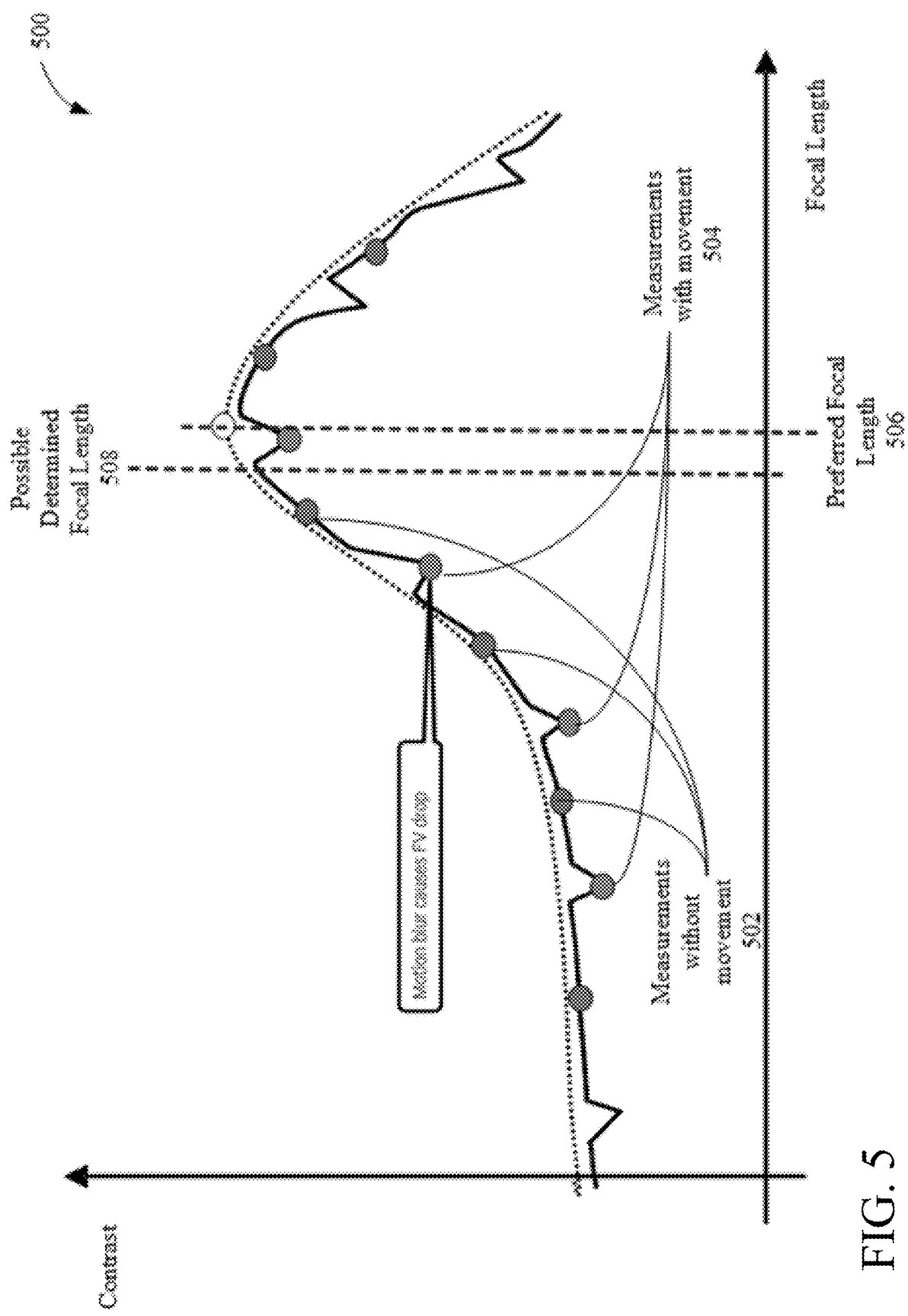
FIG. 5 is a depiction of example contrast measurements where some of the measurements are during camera movement.
Figure 6:
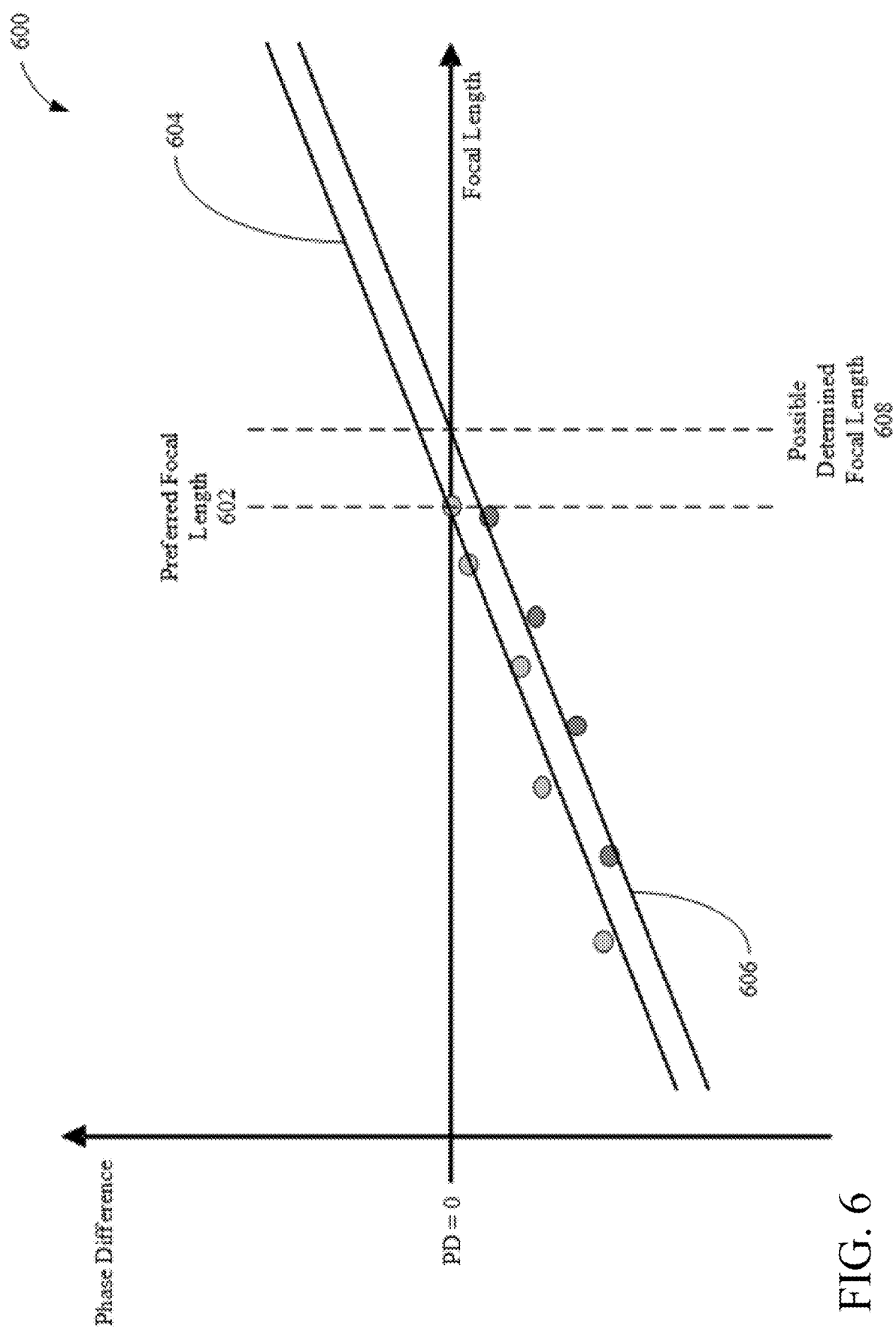
FIG. 6 is a depiction of example phase difference measurements where some of the measurements are during camera movement.

If the camera 102 moves during the AF operation, the focus value measurements (such as a contrast measurement or a PD measurement) may be lowered and thus incorrect. FIG. 5 is a depiction 500 of example contrast measurements where some of the measurements are during camera movement. As shown, the contrast measurements 502 without camera movement are approximately along the dotted contrast curve. However, the contrast measurements 504 with camera movement are lower than the dotted contrast curve. While the device 100 is to determine the focal length to be the preferred focal length 506 (which is the vertex of the dotted contrast curve), the device 100 may erroneously determine a different focal length as a result of camera movement. For example, the device 100 may determine the focal length 508 from an AF operation as a result of determining a false vertex for the contrast curve. FIG. 6 is a depiction 600 of example PD measurements where some of the measurements are during camera movement. The preferred focal length to be determined by the device 100 may be focal length 602, which corresponds along line 604 to the PD measurements without camera movement (the lighter circles). However, the device 100 may determine focal length 608 through PDAF based on a PD measurement with camera movement (the darker circles), since the PD measurements with camera movement may correspond along line 606 (which is offset from line 604).

The device 100 may determine motion of the camera 102 during one or more focus value measurements and compensate or correct for the camera movement during the AF operation. In some example implementations, the device 100 uses the gyroscope 120 to measure camera motion. In some example implementations, the device 100 may determine a camera motion (such as per a measurement from the gyroscope 120 or another motion sensor) when the instances of light for PDAF are being measured. In some additional or alternative example implementations, the device 100 may compare a previous and a current camera sensor capture when the instances of light for PDAF are being measured to determine a camera motion that may affect PDAF.

In some example implementations for CDAF, the device 100 may determine a camera motion (such as per a measurement from the gyroscope 120 or another motion sensor) when the camera 102 captures an image for which a contrast is measured. In some additional or alternative example implementations, the device 100 may compare a previous and current image capture from the camera 102 to determine a camera motion between the image captures, which may affect a contrast measurement for the current image capture. Detecting that a camera motion exists for a measurement of a focus value (such as for PDAF, CDAF, or other AF operations) may include one of, but is not limited to, measuring a camera motion from a device sensor (such as a gyroscope 120) during an image capture from which a contrast is measured, measuring a camera motion from a device sensor (such as a gyroscope 120) during measurement of light intensities in determining a phase difference, measuring a camera motion between image captures by comparing a current image capture and a previous image capture (with the current image capture used for measuring a contrast), and measuring a camera motion between image captures by comparing a current image capture and a previous image capture (and the current image may be captured when intensities of light instances are measured for PDAF). Alternative to captures from a camera sensor being compared, other suitable sensor captures may be compared to determine a camera motion (such as captures from a photodiode array or other light sensor).

While the following examples describe a three-point gyroscope (for measuring pitch, roll, and yaw), any type of gyroscope or other motion sensor may be used. Alternatively, other means for determining camera motion may be used (such as analyzing successive sensor captures to determine global motion). A three-point gyroscope may determine degrees or revolutions per second of pitch, yaw, and roll occurring during the focus value measurement. In some example implementations, the gyroscope 120 may generate a value indicating a combination of the three and thus the motion of the camera 102. For example, the gyroscope 120 may generate a motion value for pitch, yaw, and roll in a three-dimensional space x, y, z of $\sqrt{x^2+y^2+z^2}$ revolutions per second. Other suitable ways in determining camera motion may be performed, and the present disclosure should not be limited to a specific example (such as a gyroscope). For example, camera motion may be determined using a magnetometer, an accelerometer, identified motion from analyzing a stream of images, or another suitable way.

Figure 7:
FIG. 7 is an illustrative flow chart depicting an example operation for determining a focal length based on the measured focus values and a detected camera motion during an AF operation.
Figure 7:

FIG. 7 is an illustrative flow chart depicting an example operation 700 for determining a focal length based on the measured focus values and a detected camera motion during an AF operation. In determining a focal length, the device 100 may compensate for camera motion during an AF operation. Beginning at 702, the device 100 measures a plurality of focus values (such as contrast or PD), wherein each focus value is measured at a different focal length. The device 100 may also detect that a camera motion exists for the measurement of one or more of the plurality of focus values (704).

In some example implementations, a measurement from gyroscope 120 is taken when an image (for which a contrast is determined) is being captured or the intensities of light instances are being measured (for determining a phase difference). The device 100 may detect a camera motion for a measured focus value (such as a contrast or a phase difference) if the device 100 determines that the measurement from the gyroscope 120 is greater than a first threshold for detecting camera motion. For example, the device 100 determines if the value from the gyroscope 120 of $\sqrt{x^2+y^2+z^2}$ is greater than 0.03 revolutions per second. If the value is greater than the threshold, the device 100 determines that camera motion is detected for the measured focus value (which may affect the accuracy of the measured focus value).

A camera motion may exist for a measurement of a focus value without being detected as camera motion. For example, is the determined camera motion (such as from the value of the gyroscope 120) is less than the threshold, the device 100 may determine that the motion of the camera 102 is not sufficient to impact the focus value measurement. In this manner, the camera motion is not detected camera motion (which may impact the focus value measurement).

Once the device 100 determines that one or more of the measured focus values may be impacted by camera motion (detected camera motion exists for the measurement of one of more of the focus values), the device 100 may determine a focal length for the camera 102 based on the plurality of measured focus values and the detected camera motion (706). In determining the focal length, the device 100 may compensate for the camera motion in performing the AF operation. In some example implementations, the device 100 may compensate for camera motion by adjusting the impacted focus value (a focus value for which camera motion is detected). In some other example implementations, the device 100 may use curve fitting for CDAF (a parabolic curve) or line fitting for PDAF (a sloped line) to determine the correlation between the focal length and the focus values in order to determine the focal length during the AF operation. In some further example implementations, the device 100 may both adjust one or more focus values and use curve or line fitting in determining a focal length.

If a measured focus value is impacted by the motion of the camera 102 (such as the gyroscope 120 generating a value greater than a threshold), the device 100 may adjust the measured focus value for determining the focal length. In some example implementations, the device 100 may use one or more previously measured focus values (at previous focal lengths) and one or more successively measured focus values (at successive focal lengths) to adjust the current focus value. For example, the device 100 may perform an average or a moving average with the window around a current focus value for a focus value impacted by camera motion. The average may be a simple average or weighted average. To average the focus values, the device 100 may buffer or otherwise persist the measured focus values (such as in the memory 106 or a memory coupled to or included in the camera controller 110). In some example implementations, the average is a 3 point weighted average including a previous focus value, the current focus value, and a successive focus value. Since the current focus value should fall along a PD line or contrast curve, the device 100 may attempt to extrapolate the correct focus value through the weighted average.

Figure 8:
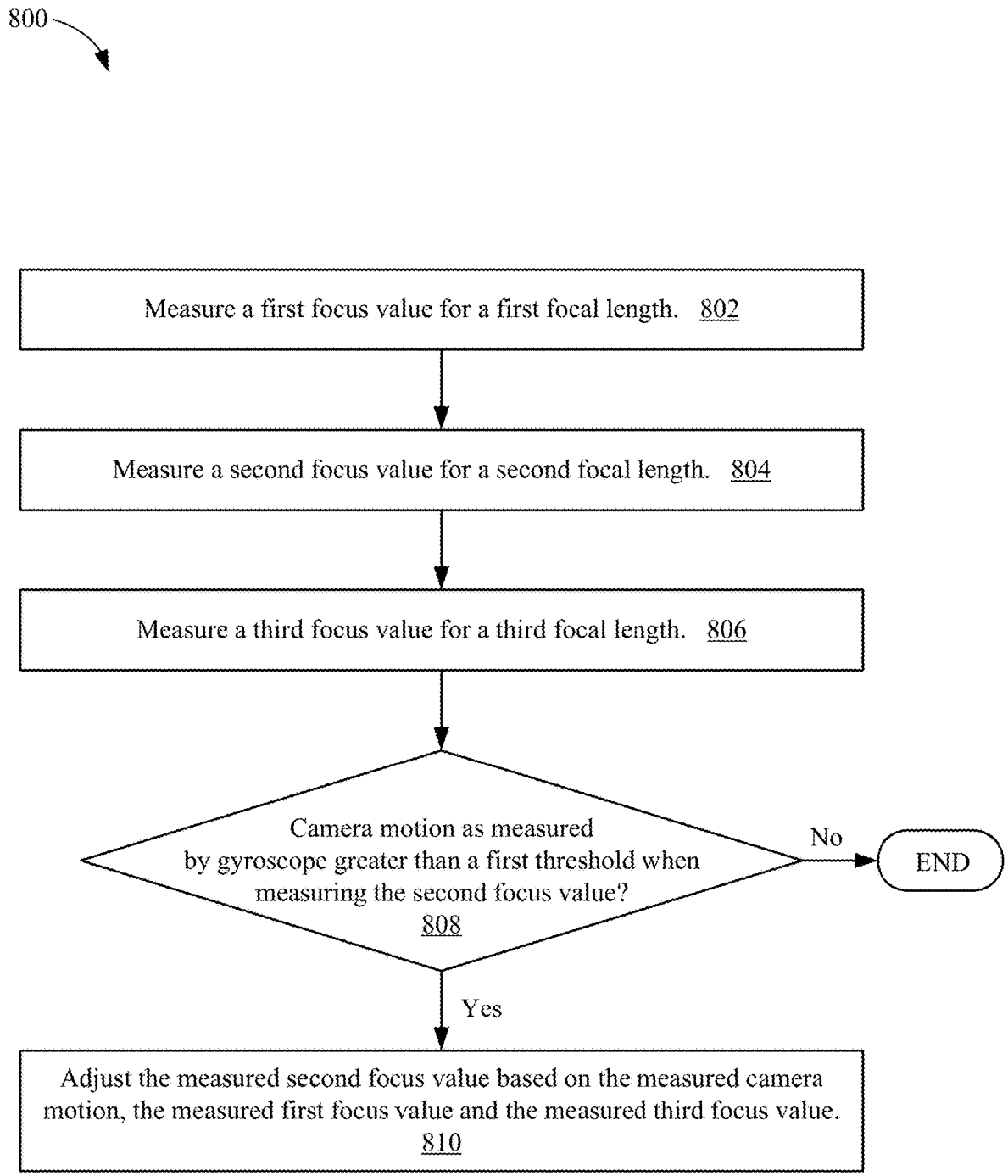
FIG. 8 is an illustrative flow chart depicting an example operation for adjusting a currently measured focus value based on measured camera movement, a previous focus value, and a successive focus value.

FIG. 8 is an illustrative flow chart depicting an example operation 800 for adjusting a currently measured focus value based on measured camera movement, a previous focus value, and a successive focus value. The device 100 may measure a first focus value (such as a contrast or PD) for a first focal length (802). The device 100 may adjust the focal length and measure a second focus value for the second focal length (804). The device 100 may further adjust the focal length and measure a third focus value for the third focal length (806). In the example, the first focus value may be a previously measured focus value buffered by device 100, the second focus value may be the currently measured focus value, and the third focus value may be a future focus value to be measured.

If the gyroscope measurement is less than a first threshold for the second focus value (808), the device 100 may determine that the second focus value is not to be adjusted (and operation 800 ends) because the second focus value is not impacted by camera motion. If the gyroscope measurement is greater than a first threshold for the second focus value (808), the device 100 may adjust the measured second focus value based on the measured camera motion, the measured first focus value and the measured third focus value (810). In some example implementations, the first threshold may be 0.03 revolutions per second.

Increasing the camera motion may increase the amount of error for the measured focus value. In this manner, if using a weighted average, the weights to be used for the focus values may be based on the amount of motion as measured by gyroscope 120. In some example implementations, the weight to be used for a focus value is decreased as the gyroscope measurement increases (e.g., more camera motion may further lower the measured focus value). For example, if the gyroscope measurement is greater than a first threshold (such as 0.03), the weight for averaging may decrease until the gyroscope measurement reaches a second threshold (such as 0.06).

Figure 9:
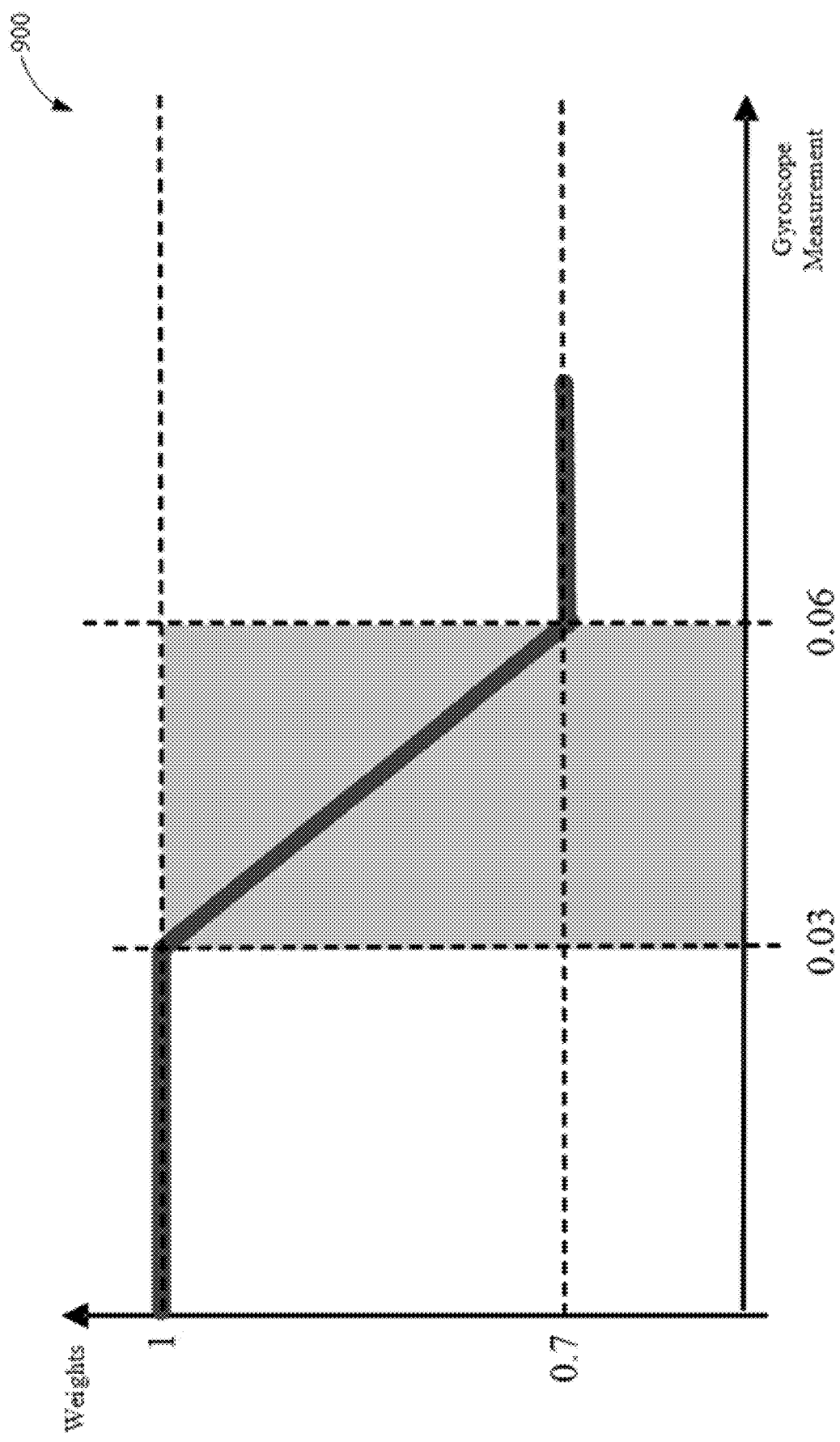
FIG. 9 is a depiction of the correlation between weights for a weighted average and gyroscope measurements of camera motion.

FIG. 9 is an example depiction 900 of the correlation between weights for a weighted average and gyroscope measurements of camera motion. The weights may decrease linearly from 1 to 0.7 as the gyroscope measurement increases between a first threshold and a second threshold. Alternatively, the relationship between weights and gyroscope measurements may take other forms, such as being non-linear, a step wise function, and so on. If the gyroscope measurement is greater than the second threshold, the device 100 may use the same weight (such as 0.7). Using the relationship between the weights and gyroscope measurements, the device 100 may determine the weight associated with a focus value. The device 100 may include a LUT relating the gyroscope measurements to the weights to be used. For example, memory 106 may include a LUT 109 to be used for determining the weights for the weighted average.

In some example implementations, the adjusted focus value may be a three-point weighted average as depicted in equation (1) below:

$$AFV = \frac{(PFV*PW + CFV*CW + SFW*SW)}{(PW + CW + SW)} \quad (1)$$

where AFV is the adjusted focus value, PFV is the previous focus value, CFV is the current focus value, SFV is the successive focus value, PW is the weight for the previous focus value, CW is the weight for the current focus value, and SW is the weight for the successive focus value. Alternatively, the weighted average may include any number of points (such as 4, 5, or more points).

For a three-point weighted average, if only one or two measured focus values are impacted by camera motion, the device 100 may adjust the impacted focus values and determine the focal length using the adjusted focus values. If all of the focus values are impacted by camera motion (such as the gyroscope measurement being greater than the first threshold), the device 100 may not adjust the current focus value to reduce adjustment errors. In some example implementations, the device 100 may remeasure the current focus value until the focus value is not impacted by camera motion. Additionally or alternatively, the device 100 may determine the PD line or contrast curve using a first or second order regression model, respectively, from a plurality of measured or adjusted focus values. For example, if the duration or severity of the camera motion is sufficiently long or large to affect a threshold number of consecutively measured focus values, the device 100 may perform a first order or linear regression for PD (y=ax+b) or a second order regression for contrast (y=ax$^2$+bx+c). For a first order regression, at least two focus values may be needed to determine two variables a and b and thus the relationship between PD and the focal length (two measurements to provide two points of the sloped line). For a second order regression, at least three focus values may be needed to determine three variables a, b, and c and thus the relationship between contrast and the focal length. However, any number of focus values greater than two for a linear regression and three for a second order regression may also be determined and used.

For PDAF, the device 100 may increase the focal length (such as a predefined number of focal length stops) between PD measurements and measure the PD until at least two PDs are measured with a corresponding gyroscope measurement less than a first threshold. Alternatively, the device 100 may adjust one or more of the measured PD (such as by using a weighted average), and use the adjusted PD and measured PD not affected by camera motion to determine the linear correlation between PD and focal length. In some example implementations, the device 100 continues to increase the focal length and measure the PD (before determining the correlation between PD and focal length) until an adjusted PD or measured PD not impacted by camera motion is greater than zero.

Similarly for CDAF, the device 100 may increase the focal length between contrast measurements and measure the contrast until at least three contrasts are determined. In some example implementations, the device 100 may adjust one or more contrasts impacted by camera motion (such as by weighted averaging). The contrasts to be used for the second order regression may be adjusted contrasts and/or measured contrasts not impacted by camera motion.

Figure 10:
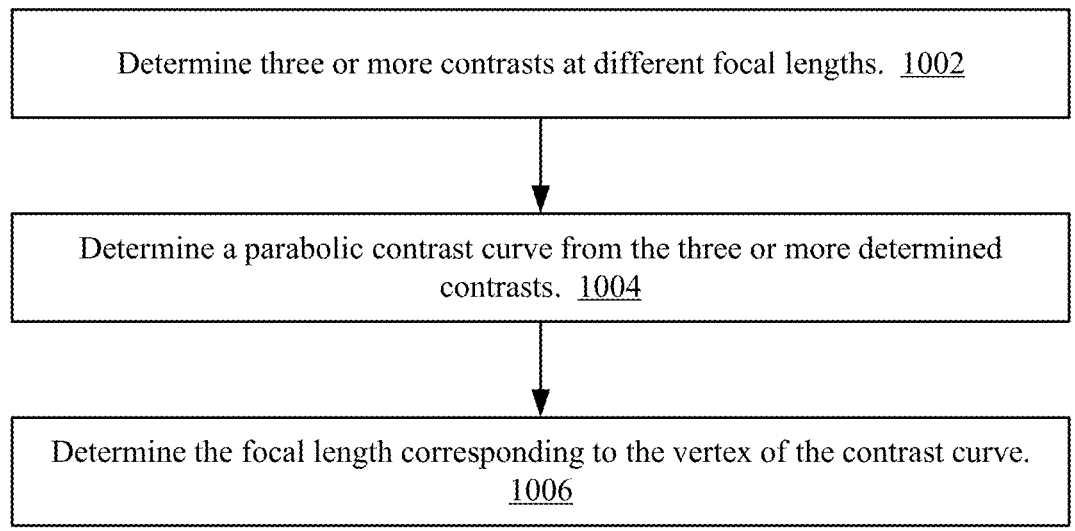
FIG. 10 is an illustrative flow chart depicting an example operation for determining a focal length from an approximated contrast curve.

FIG. 10 is an illustrative flow chart depicting an example operation 1000 for determining a focal length from an approximated contrast curve. The device 100 may determine three or more contrasts at different focal lengths (1002). The contrasts may be adjusted contrasts for which the measured contrast is impacted by camera motion and/or measured contrasts not impacted by camera motion. The device 100 then uses the three or more determined contrasts to determine a parabolic contrast curve correlating contrasts to focal lengths (1004). The device 100 may then determine the focal length corresponding to the vertex of the determined contrast curve (1006).

Figure 11:
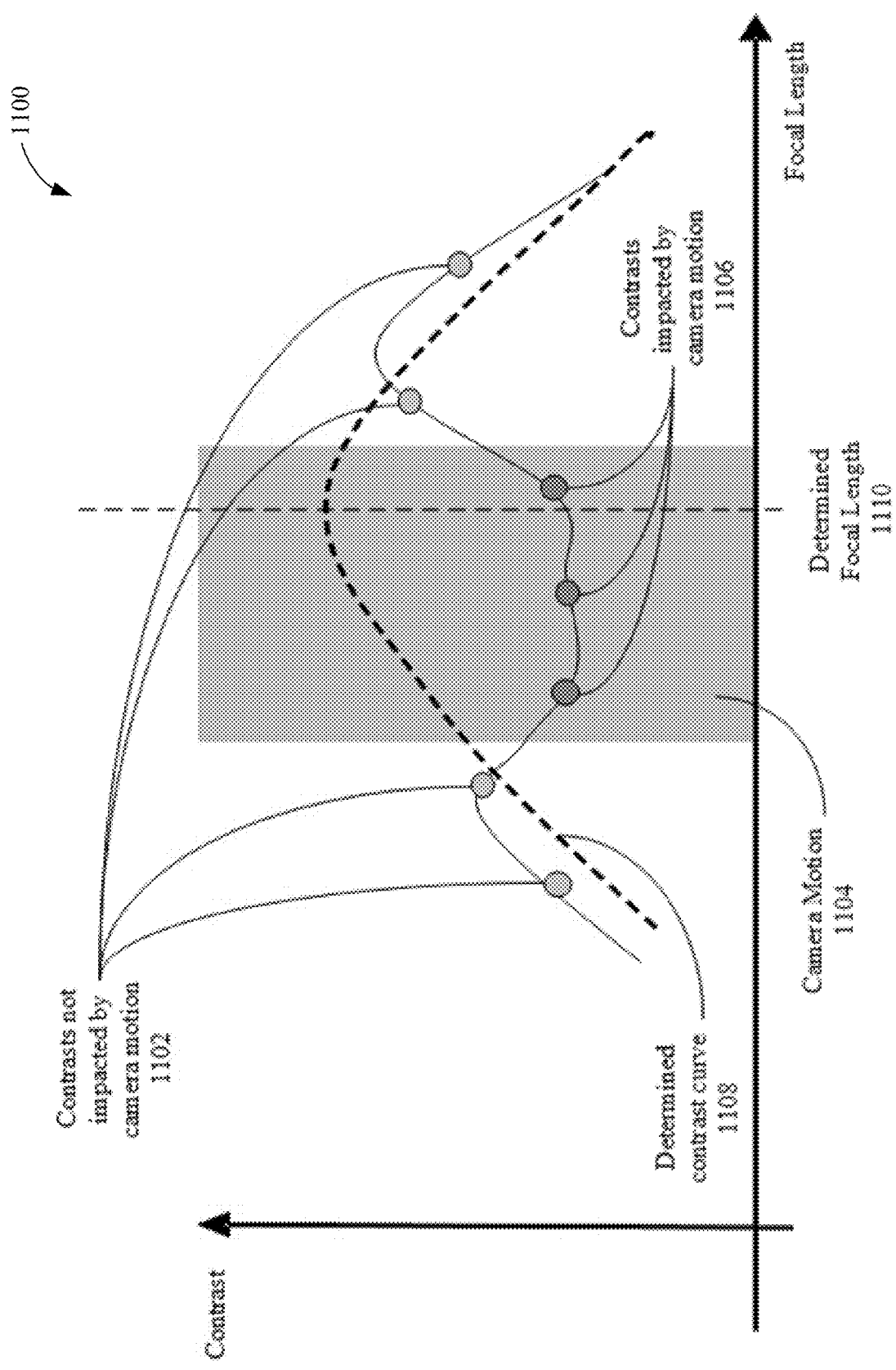
FIG. 11 is a depiction of example contrast measurements until the contrasts between two successive measurements not impacted by camera motion decreases.

In measuring or determining the contrasts, the device 100 may increase the focal length and continue measuring the contrast until a first contrast (such as an adjusted contrast or a measured contrast not impacted by camera motion) is greater than the successive contrast. FIG. 11 is a depiction 1100 of example contrast measurements until the contrasts between two successive measurements not impacted by camera motion decreases. Camera motion 1104 impacts the measured contrasts 1106. In this manner, the device 100 increases the focal length until the contrasts 1102 not impacted by camera motion decreases. The device 100 may then use contrasts 1102 to determine contrast curve 1108. The device 100 may then determine the focal length for the AF operation to be the focal length 1110 corresponding to the vertex of the determined contrast curve 1108.

In some example implementations, the device 100 may use a least square parabolic line approximation to determine the contrast curve 1108. As previously noted, the general equation for a parabola is y=ax$^2$+bx+c, where y is the contrast and x is the focal length, and the device has three or more contrast measurements for different focal lengths $((x_1, y_1), (x_2, y_2), \ldots (x_n, y_n))$. Constructing matrices for X, Y and the variables B of the parabola general equation may be as indicated in equation (2) below:

$$X = \begin{bmatrix} 1 & x_1 & x_1^2 \\ \vdots & \vdots & \vdots \\ 1 & x_n & x_n^2 \end{bmatrix}, Y = \begin{bmatrix} y_1 \\ \vdots \\ y_n \end{bmatrix}, B = \begin{bmatrix} c \\ b \\ a \end{bmatrix} \quad (2)$$

In some example implementations, the device 100 may use a least square parabolic line approximation method, as indicated in equation (3) below:

$$(X^t X)B = X^t Y \qquad (3)$$

where $X^t$ is the transposition of matrix X. Substituting the matrices in equation (2) into equation (3) yields equation (4) below:

$$\begin{bmatrix} 1 & x_1 & x_1^2 \\ \vdots & \vdots & \vdots \\ 1 & x_n & x_n^2 \end{bmatrix}^T \begin{bmatrix} 1 & x_1 & x_1^2 \\ \vdots & \vdots & \vdots \\ 1 & x_n & x_n^2 \end{bmatrix} \begin{bmatrix} c \\ b \\ a \end{bmatrix} = \begin{bmatrix} 1 & x_1 & x_1^2 \\ \vdots & \vdots & \vdots \\ 1 & x_n & x_n^2 \end{bmatrix}^T \begin{bmatrix} y_1 \\ \vdots \\ y_n \end{bmatrix} \qquad (4)$$

which expands to equation (5) below:

$$\begin{bmatrix} n & \sum_{i=1}^{n} x_i & \sum_{i=1}^{n} x_i^2 \\ \sum_{i=1}^{n} x_i & \sum_{i=1}^{n} x_i^2 & \sum_{i=1}^{n} x_i^3 \\ \sum_{i=1}^{n} x_i^2 & \sum_{i=1}^{n} x_i^3 & \sum_{i=1}^{n} x_i^4 \end{bmatrix} \begin{bmatrix} c \\ b \\ a \end{bmatrix} = \begin{bmatrix} \sum_{i=1}^{n} y_i \\ \sum_{i=1}^{n} x_i y_i \\ \sum_{i=1}^{n} x_i^2 y_i \end{bmatrix} \qquad (5)$$

Using the known $((x_1, y_1), (x_2, y_2), \ldots (x_n, y_n))$, equation (5) can be deduced to a three equation set as indicated in equation (6) below:

$$\begin{bmatrix} m_{11} & m_{12} & m_{13} \\ m_{21} & m_{22} & m_{23} \\ m_{31} & m_{32} & m_{33} \end{bmatrix} \begin{bmatrix} c \\ b \\ a \end{bmatrix} = \begin{bmatrix} n_1 \\ n_2 \\ n_3 \end{bmatrix} \qquad (6)$$

$a_i, b_i \in R$ where $m_{kl}$ (for k and l an integer from 1 to 3) is the value determined when substituting $((x_1, y_1), (x_2, y_2), \ldots (x_n, y_n))$ into equation (5). Gaussian elimination may then be used to place the matrix in echelon form, as indicated in equation (7) below:

$$\begin{bmatrix} m'_{11} & m'_{12} & m'_{13} \\ 0 & m'_{22} & m'_{23} \\ 0 & 0 & m'_{33} \end{bmatrix} \begin{bmatrix} c \\ b \\ a \end{bmatrix} = \begin{bmatrix} n_1 \\ n_2 \\ n_3 \end{bmatrix} \qquad (7)$$

$a_{ij}, b_i \in R$ where $m_{kl}'$ is the value determined through Gaussian elimination. The device 100 may therefore use equation (7) to determine the values for variables a, b, and c, and thus the variables of the second order equation $y = ax^2 + bx + c$ for the contrast curve.

After determining the values a, b, and c for the contrast curve represented by second order equation $y = ax^2 + bx + c$, the device 100 may determine the position of the vertex of the contrast curve, which is $-b/2a$. Therefore, the device 100 may determine the focal length to be at or near $-b/2a$ during the CDAF operation.

Figure 12:
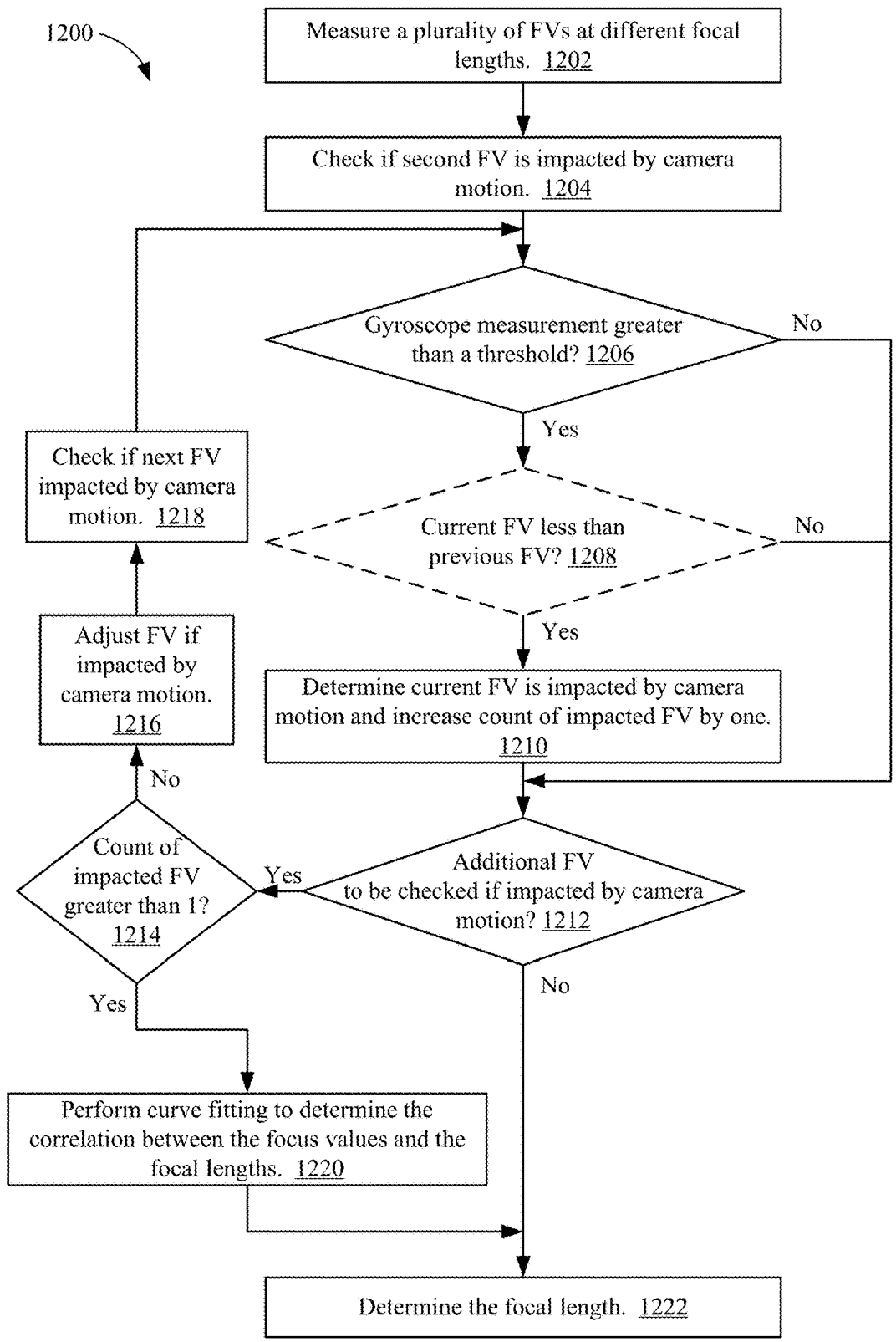
FIG. 12 is an illustrative flow chart depicting an example operation for compensating for camera motion, including adjusting one or more focus values and performing curve fitting to estimate the correlation between the focus values and the focal lengths.

In some example implementations, the device 100 may use a combination of adjusting one or more focus values and estimating the correlation between focus values and focal lengths (such as estimating a second order contrast curve or estimating a first order PD line) in compensating for camera motion. FIG. 12 is an illustrative flow chart depicting an example operation 1200 for compensating for camera motion, including adjusting one or more focus values and performing curve fitting to estimate the correlation between the focus values and the focal lengths.

Beginning at 1202, the device 100 may measure a plurality of focus values, wherein each focus value is measured at a different focal length. For example, the device 100 may repeatedly increment the focal length by a predefined number of stops and measure the focus value for the focal length. In some example implementations, the device 100 may measure the first focus value when the camera motion is not to impact the measurement (such as the gyroscope 120 measuring a camera motion less than a threshold). In this manner, the device 100 may determine if the second focus value (and subsequent focus values) is impacted by camera motion (1204). Alternatively, the device 100 may also determine if the first focus value is impacted by camera motion.

If the gyroscope 120 measurement is greater than a threshold (1206), the device 100 may determine that the current focus value is impacted by camera motion (1210). In some example implementations, each focus length for which a focus value is measured may be associated with a flag (such as a bit flag). In this manner, if the focus value is impacted by camera motion, the device 100 may set the flag (such as setting the bit flag to one) for the focal length corresponding to the measured focus value. In some examples, the flag may be included in a generated data structure for the measured focus value, or the flags may be included together in a data structure (such as to be stored in a buffer or memory 106). In some example implementations, if the device 100 is to perform curve fitting to determine a contrast curve or PD line, the device 100 may use the flags to determine which focus values to use. The device 100 may also indicate using the flag if a focus value is adjusted. For example, the device 100 may reset the bit flag to zero, or the flag may have three or more states so that one state indicates that the focus value is adjusted.

The device 100 may also keep a count of focus values impacted by camera motion. In this manner, if the gyroscope 120 measurement is greater than a threshold (1206), the device 100 may increase the count by one since the current focus value is impacted (1210). In some example implementations (as described later), if the count of focus values impacted by camera motion is greater than a threshold, the device 100 determines to perform curve fitting for determining the focal length for the AF operation.

In some example implementations for determining that the current focus value is impacted by camera motion, the device 100 may also optionally determine if the current focus value is less than the previous focus value (1208). If the gyroscope 120 measurement is less than the first threshold (1206) (or optionally the current focus value is greater than the previous focus value (1208)), the device 100 may not identify the current focus value as impacted by camera motion. In this manner, the device 100 may not increment the count of impacted focus values or flag the focal length corresponding to the current focus value.

The device 100 may determine if additional focus values are to be checked if impacted by camera motion (1212). If additional focus values are to be checked (1212), and the count of impacted focus values is not greater than a threshold (1214), the device 100 may adjust the current focus value if impacted by camera motion (1216). The device 100 may also check if the next focus value is impacted by camera motion (1218), with the process reverting to 1206. In the example operation 1200, the threshold for the count of impacted focus values is one. As a result, if two or more focus values are impacted by camera motion, the device 100 may determine to perform curve fitting (1220). In other examples, the threshold may be any suitable number greater than one for determining whether to perform curve fitting.

Referring back to 1216 and as described above, the device 100 may adjust a focus value by using a weighted average. In some example implementations, the weighted average is to include at least one focus value not impacted by camera motion. If, for a three-point weighted average using the previous, current and successive focus values, all of the focus values are impacted by camera motion, the device 100 may determine not to adjust the focus value and instead perform curve fitting or otherwise estimate the correlation between the focus values and the focal lengths (as described above). In the example operation 1200, if the previous focus value and the current focus value are impacted by camera motion, the count of impacted focus values is greater than one (1214), and the device 100 may determine to perform curve fitting (1220) instead of attempting to adjust the current focus value impacted by camera motion (1216).

If the count of sequential focus values impacted by camera motion is greater than the threshold (such as one in 1216), the device 100 may perform curve fitting to determine the correlation between the focus values and the focal lengths (1220). The device 100 may then determine the focal length for the AF operation (1222), such as by determining the vertex of a contrast curve or where the PD line crosses the PD equaling zero. As previously noted, in performing curve fitting, the device 100 may use the focus values not impacted by camera motion (and optionally any adjusted focus values from 1216). For example, the device 100 may determine the focus values to be used based on the flags indicating if the focus values are impacted by camera motion.

Referring back to 1214, if no additional focus values are to be checked, and the count of impacted focus values is not greater than the threshold (such as one in 1214), the device 100 may determine the focal length (1222) by using conventional AF operations. For example, the device 100 may perform coarse and fine adjustments for CDAF or the device 100 may determine a focal length where the PD equals zero from a measured PD value at a known focal length (with the slope and offset of the PD line known a priori).

While the count of impacted focus values has a threshold of one in FIG. 12, the threshold may be any number of suitable focus values. Additionally, while FIG. 12 indicates that adjusting one or more focus values and curve fitting may be performed during an AF operation, alternatively, the device 100 may adjust focus values or perform a curve fit in determining a focal length. In some example implementations, the device 100 uses to the gyroscope measurement to determine to set the flag and count of impacted focus values approximately when the focus value is measured for the focal length. Therefore, the steps illustrated and described for FIG. 12 may occur in any order, not all steps may be performed, or additional steps may be performed. FIG. 12 illustrates an example operation 1200 for describing the present disclosure, and the present disclosure should not be limited to the example operation 1200 or the other provided examples.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 106 in the example device 100 of FIG. 1) comprising instructions 108 that, when executed by the processor 104 (or the camera controller 110 or the image signal processor 112), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 104 or the image signal processor 112 in the example device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 100, the camera controller 110, the processor 104, and/or the image signal processor 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device, comprising:
a memory; and
a processor coupled to the memory and configured to:
measure a plurality of focus values during an autofocus operation for a camera, wherein each focus value is measured at a different focal length;
detect that a camera motion exists for the measurement of one or more of the plurality of focus values;
adjust a measured focus value for which the camera motion is detected based on an average of the measured focus value for which the camera motion is detected and one or more other focus values of the plurality of measured focus values; and
determine a focal length based on the plurality of measured focus values and the adjusted focus value.

2. The device of claim 1, wherein the processor is further configured to:
combine the measured focus value for which the camera motion is detected and the one or more other focus values in adjusting the measured focus value.

3. The device of claim 1, wherein the processor is further configured to: determine a magnitude of camera motion for each focus value being averaged, wherein the average is a weighted average and a weight for each focus value being averaged is based on the magnitude of camera motion for that focus value.

4. The device of claim 1, wherein the average of the measured focus value for which the camera motion is detected and the one or more other focus values of the plurality of measured focus values is a weighted average.

5. A method, comprising:
measuring a plurality of focus values during an autofocus operation for a camera, wherein each focus value is measured at a different focal length;
detecting that a camera motion exists for the measurement of one or more of the plurality of focus values;
adjusting a measured focus value for which the camera motion is detected based on an average of the measured focus value for which the camera motion is detected and one or more other focus values of the plurality of measured focus values; and
determining a focal length based on the plurality of measured focus values and the adjusted focus value.

6. The method of claim 5, further comprising:
combining the measured focus value for which the camera motion is detected and the one or more other focus values in adjusting the measured focus value.

7. The method of claim 5, further comprising:
determining a magnitude of camera motion for each focus value being averaged, wherein the average is a weighted average and a weight for each focus value being averaged is based on the magnitude of camera motion for that focus value.

8. The method of claim 5, wherein the average of the measured focus value for which the camera motion is detected and the one or more other focus values of the plurality of measured focus values is a weighted average.

9. A non-transitory computer-readable medium storing one or more programs containing instructions that, when executed by one or more processors of a device, cause the device to:
measure a plurality of focus values during an autofocus operation for a camera, wherein each focus value is measured at a different focal length;
detect that a camera motion exists for the measurement of one or more of the plurality of focus values;
adjust a measured focus value for which the camera motion is detected based on an average of the measured focus value for which the camera motion is detected and one or more other focus values of the plurality of measured focus values; and
determine a focal length based on the plurality of focus values and the adjusted focus value.

10. The computer-readable medium of claim 9, wherein the instructions further cause the device to:
combine the measured focus value for which the camera motion is detected and the one or more other focus values in adjusting the measured focus value.

11. The computer-readable medium of claim 9, wherein the instructions further cause the device to: determine a magnitude of camera motion for each focus value being averaged, wherein the average is a weighted average and a weight for each focus value being averaged is based on the magnitude of camera motion for that focus value.

12. The computer-readable medium of claim 9, wherein the average of the measured focus value for which the camera motion is detected and the one or more other focus values of the plurality of measured focus values is a weighted average.

13. A device, comprising:
means for measuring a plurality of focus values during an autofocus operation for a camera, wherein each focus value is measured at a different focal length;
means for detecting that a camera motion exists for the measurement of one or more of the plurality of focus values;
means for adjusting a measured focus value for which the camera motion is detected based on an average of the measured focus value for which the camera motion is detected and one or more other focus values of the plurality of measured focus values; and
means for determining a focal length based on the plurality of focus values and the adjusted focus value.

14. The device of claim 13, further comprising:
means for combining the measured focus value for which the camera motion is detected and the one or more other focus values in adjusting the measured focus value.

15. The device of claim 13, further comprising:
means for determining a magnitude of camera motion for each focus value being averaged, wherein the average is a weighted average and a weight for each focus value being averaged is based on the magnitude of camera motion for that focus value.

16. The device of claim 13, wherein the average of the measured focus value for which the camera motion is detected and the one or more other focus values of the plurality of measured focus values is a weighted average.

* * * * *